S. WILSON.
DRAFT GEAR FOR GANG PLOWS.
APPLICATION FILED OCT. 18, 1919.

1,337,870. Patented Apr. 20, 1920.

S. Wilson.
Inventor

By Geo. P. Kimmel
Attorney

UNITED STATES PATENT OFFICE.

STANFORD WILSON, OF DAVIS, CALIFORNIA.

DRAFT-GEAR FOR GANG-PLOWS.

1,337,870. Specification of Letters Patent. Patented Apr. 20, 1920.

Application filed October 18, 1919. Serial No. 331,733.

*To all whom it may concern:*

Be it known that I, STANFORD WILSON, a citizen of the United States, residing at Davis, in the county of Yolo and State of California, have invented certain new and useful Improvements in Draft-Gears for Gang-Plows, of which the following is a specification.

The invention has for its object to provide an improved draft gear for connecting gang plows with a tractor including a draft beam disposed obliquely to the line of movement of the plows and connected with the tractor in such manner that the plows are caused to make a wide turn at the corners of a field and thus minimize the unplowed areas at such corners.

With this and other objects in view as will appear as the description proceeds the invention comprises the novel features of construction, accompanied by elements and arrangement of parts which will be more fully described in the following specification and set forth with particularity in the claims appended hereto.

Figure 1:
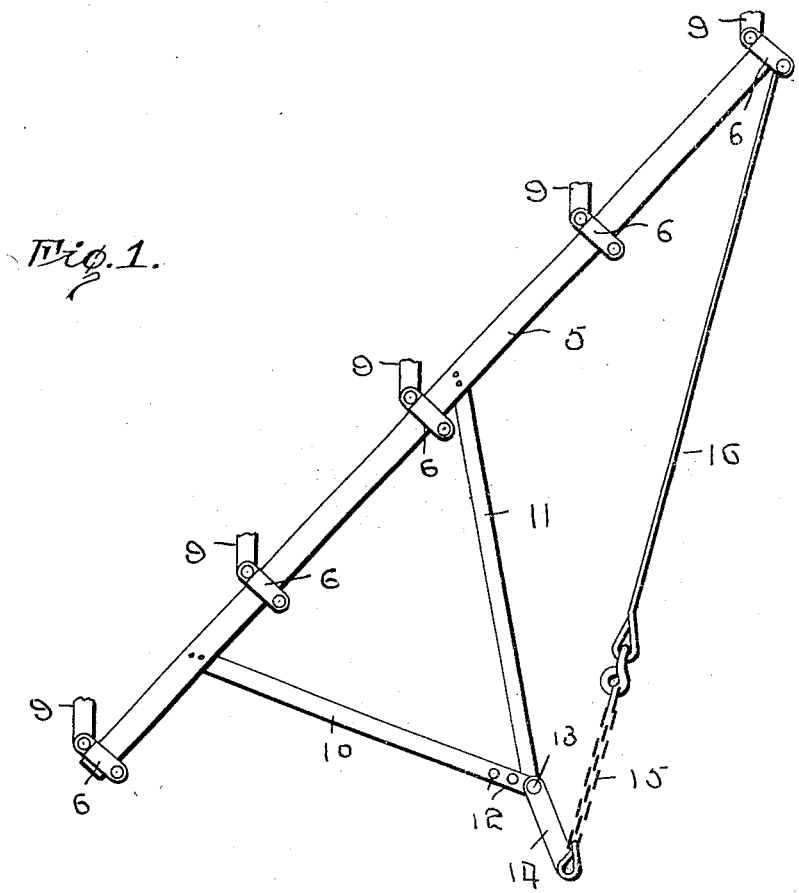
Figure 1 represents a plan view of the draft gear.
Figure 2:
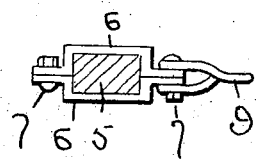
Fig. 2 represents a transverse sectional view through the draft rod.

Referring to the drawing in detail, wherein similar reference numerals designate corresponding parts throughout the several views the numeral 5 indicates the draft bar which is provided at equal distant intervals with clips which are preferably constructed of two substantially U-shaped members 6 arranged in opposed relation above and below the rod 5 and having extended terminals receiving bolts 7 whereby the clip members are rigidly attached to the draft rod. The rear bolts of the attaching clips 6 are pivotally connected with links 9 adapted for connection with the clevises of the beams of the gang plows (not shown).

Forwardly converging draft bars 10 and 11 are arranged forwardly of the rod 5, the outer bar 10 being connected adjacent one terminal of the rod 5 and the other bar 11 being attached thereto at a point adjacent the center of the draft rod. The front terminals of the bars 10 and 11 are pivotally connected by a bolt 13 and the angularity of the rods may be varied by selective engagement of the bolt 13 with any one of a series of apertures 12 formed in the forward extremity of the bar 10.

A coupling link 14 is pivotally attached to the forward terminals of the draft bars 10 and 11 by the bolt 13 and is adapted for connection at its forward terminal, with the coupling element of a tractor (not shown).

A connecting element 16 in the form of a cable or other flexible member is attached at its rear terminal to the extremity of the draft rod 5 opposite the bar 10 and is attached at its forward terminal with a relatively short chain section 15 the front link of which is of such internal diameter as to receive the coupling bolt of the coupler of the tractor whereby the flexible connecting member is attached thereto.

What I claim is:

1. A draft gear for gang plows including a draft rod, plow beam attaching clips carried by the rod, draft bars connected adjacent the center and one terminal of the rod, and a flexible draft element connected with the opposite terminal of the rod and extending forwardly therefrom.

2. A draft gear for gang plows including a draft rod, bars pivotally attached adjacent the center and one terminal of the rod and extending forwardly therefrom in converging planes, an adjustable connection between the forward converged terminals of the bars, and a flexible draft element extending forwardly from the opposite terminal of the draft rod and extending toward the converged terminals of the bars.

3. A draft gear for gang plows including a draft rod, plow beam attaching means carried thereby, a relatively short draft bar pivotally attached adjacent one terminal of the rod and extending obliquely therefrom, an intermediate draft bar pivotally connected with the medial portion of the draft rod and extending forwardly therefrom, an adjustable pivotal connection between the first and second mentioned bars, and a flexible draft element connected with the opposite terminal of the rod and extending forwardly therefrom.

In testimony whereof, I affix my signature hereto.

STANFORD WILSON.